United States Patent [19]

Yevick

[11] 4,111,695

[45] Sep. 5, 1978

[54] NO GLASSES 3-D VIEWER

[75] Inventor: George Johannus Yevick, Leonia, N.J.

[73] Assignee: Izon Corporation, Stamford, Conn.

[21] Appl. No.: 725,895

[22] Filed: Sep. 22, 1976

Related U.S. Application Data

[62] Division of Ser. No. 582,170, May 30, 1975, Pat. No. 4,012,116.

[51] Int. Cl.² .............. G03C 5/04; G03C 9/00
[52] U.S. Cl. .......................... 96/40; 96/38.2; 96/45; 96/27 R; 96/81; 350/132; 350/167
[58] Field of Search .............. 96/40, 81, 38.2, 27, 96/27 H, 45; 354/102, 115; 352/66, 67; 350/167, 132

[56] References Cited

U.S. PATENT DOCUMENTS

| 2,144,649 | 1/1939 | Eggert et al. | 96/81 X |
|---|---|---|---|
| 2,560,538 | 7/1951 | Ayres | 96/40 X |
| 2,724,312 | 11/1955 | Gruetzner | 96/40 |
| 2,763,551 | 9/1956 | Smith | 96/40 X |
| 3,520,588 | 7/1970 | Salyer et al. | 96/40 X |
| 3,751,258 | 8/1973 | Howe et al. | 96/81 |
| 3,824,609 | 7/1974 | Tevick | 354/102 |
| 4,012,116 | 3/1977 | Tevick | 350/132 |

Primary Examiner—Edward C. Kimlin
Assistant Examiner—Alfonso T. Suro Pico
Attorney, Agent, or Firm—Thomas J. Greer, Jr.

[57] ABSTRACT

An apparatus for three-dimensional viewing of stored color information. A microfiche (lensfiche) formed by known techniques is viewed without the requirement of special glasses worn by an individual viewing the display. Each lens of a lenticular lensplate is associated with a pair of apertures, the apertures receiving light polarized in two mutually orthogonal directions. One aperture of each aperture pair passes only polarized light of one kind and images this light at a point in front of the lensplate corresponding to the normal viewing position of one eye. The other aperture of each aperture pair passes only polarized light of the other kind and images this light at a point in front of the lensplate corresponding to the normal viewing position of the other eye.

2 Claims, 7 Drawing Figures

NO GLASSES 3-D VIEWER

This is a division of application Ser. No. 582,170 filed May 30, 1975, now U.S. Pat. No. 4,012,116.

This invention relates to a microfiche viewer for three-dimensional, color viewing which does not require the use of the usual polarized glasses worn by the individual. In U.S. Pat. No. 3,824,609, there is disclosed an apparatus and method for taking three-dimensional color photographs. The photographs, prior to projection, assume the form of dispersed microimages on a photographic emulsion. In addition to this teaching, the attention of the reader is also invited to U.S. Pat. No. 3,864,034 for a basic discussion of the construction and use of microfiche devices which employ distributed information sets for storing and for projecting optical information. According to the teachings of my prior U.S. Pat. No. 3,824,609, an individual wishing to view a three-dimensional scene recorded by the method there set forth must employ the customary polarized eye glasses, one lens of which passes only polarized light of one direction and the other lens of which transmits only light of an orthogonally polarized direction.

According to the practice of the present invention, a viewing apparatus is constructed such that the individual viewer need not wear special polarizing glasses to apprehend a three-dimensional presentation. In order to carry out the invention, light projected through microimages carried by the microfiche emulsion is (as illustrated in my U.S. Pat. No. 3,824,609) passed through color filters and thence to right eye and left eye polarizing elements, there being one pair of such polarizing elements for each individual dispersed information subset projected. Now, in distinction to the mode of viewing shown in that patent, according to the construction of the present invention light from the right and left eye polarizers passes through pairs of apertures in an opaque coating beneath a lenticular viewing (display) screen. Each aperture pair is, in turn, defined by a right eye aperture and a left eye aperture, each aperture carrying (different) polarizers of the two types first mentioned. Thus, light from the first polarizing element passes to the several pairs of apertures. Only the left eye aperture of each pair will pass left polarized light, while only the right aperture of each pair will pass right polarized light. Each aperture pair carried by the opaque coating adjacent the viewing screen is correspondingly (homologously) positioned with respect to a single convex lens on the top surface of the lenticular viewing screen. Thus, all light through, for example, the left polarizing aperture of each pair will finally exit at approximately a fixed angle with respect to the plane of the lenticular screen. Similarly, light passing through the right polarizing aperture of the opaque coating carried adjacent the viewing screen will exit through the plane of the lenticular screen at a different angle. This divergency or difference of angle yields the desired three-dimensional effect when the viewing screen is positioned the normal viewing distance from the eyes of the individual.

Figure 1:
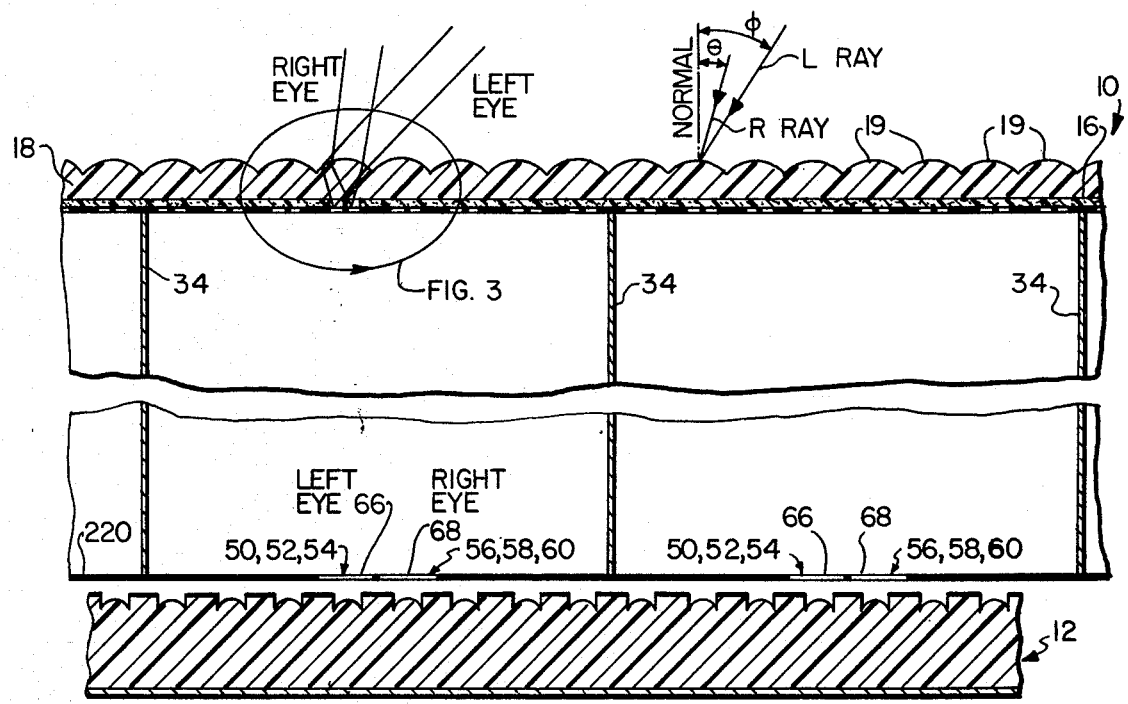
FIG. 1 is a partial elevational view of a portion of the apparatus of this invention and is shown in combination with a microfiche (lensfiche).
Figure 2:
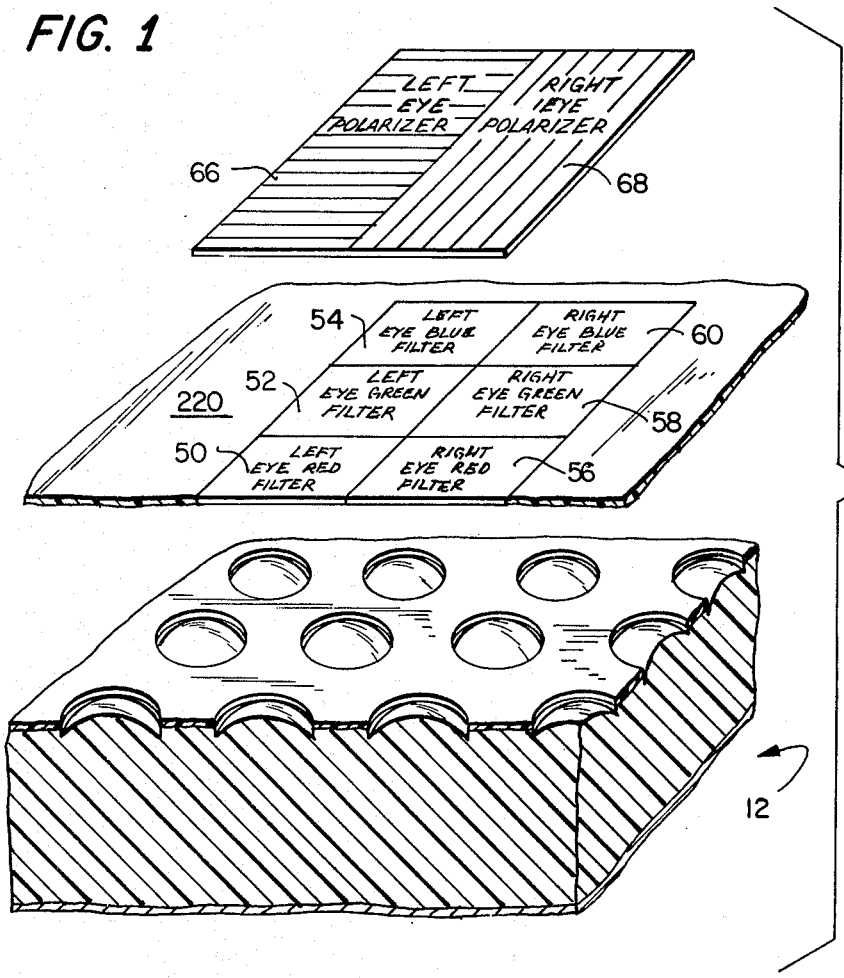
FIG. 2 is a partial perspective of a portion of the apparatus and of the microfiche shown at FIG. 1.

Referring now to FIG. 1 of the drawings, the numeral 10 denotes generally the viewing apparatus of this invention and is illustrated as receiving a microfiche (lensfiche) denoted by the numeral 12. The microfiche 12 is in all respects similar to that illustrated at FIG. 9 of U.S. Pat. No. 3,824,609 and is assumed already to have been exposed and developed so that it carries a plurality of microimages within its emulsion, the formation of these images having taken place in a manner there described. The viewing apparatus includes a screen denoted by the numeral 16 which may assume the form of a sheet of cloudy plastic so that light striking it will be diffused yet transmitted. Similarly, it may assume the form of a sheet of glass which has been roughened on one or both sides, also for the purpose of forming an image. The numeral 18 denotes a lenticular lens plate having a plurality convex lenses 19 which may be formed of clear glass or clear plastic. The sheet 16 is on the underside of the lenticular plate 18. The numeral 34 denotes any one of a plurality of intersecting, and generally planar opaque septa. The numeral 220 denotes an opaque sheet having left eye color filters 50, 52, 54 and having right eye color filters 56, 58, 60. The numeral 66 denotes a left eye polarizer adapted to be placed over the left eye color filters while the numeral 68 denotes a right eye polarizer of a mutually orthogonal direction and adapted to be placed over the right eye color filters. Clearly, the color filters and the polarizing elements may be combined, although they are shown in FIG. 2 as separated. It will be observed that there is one such set of color filters and polarizers for each cell defined by the intersecting septa 34. The construction shown at FIG. 2 is similar as that shown in FIG. 9 of the U.S. Pat. No. 3,824,609. The intersecting septa defines open-ended cells over the entire surface of the apparatus, with the apparatus being of the same general area extent as that of microfiche 12. The bottom of each of the open-ended cells faces opaque sheet 220, while the top of each of the open-ended cells faces the lenticular viewing screen 18.

Figure 3:
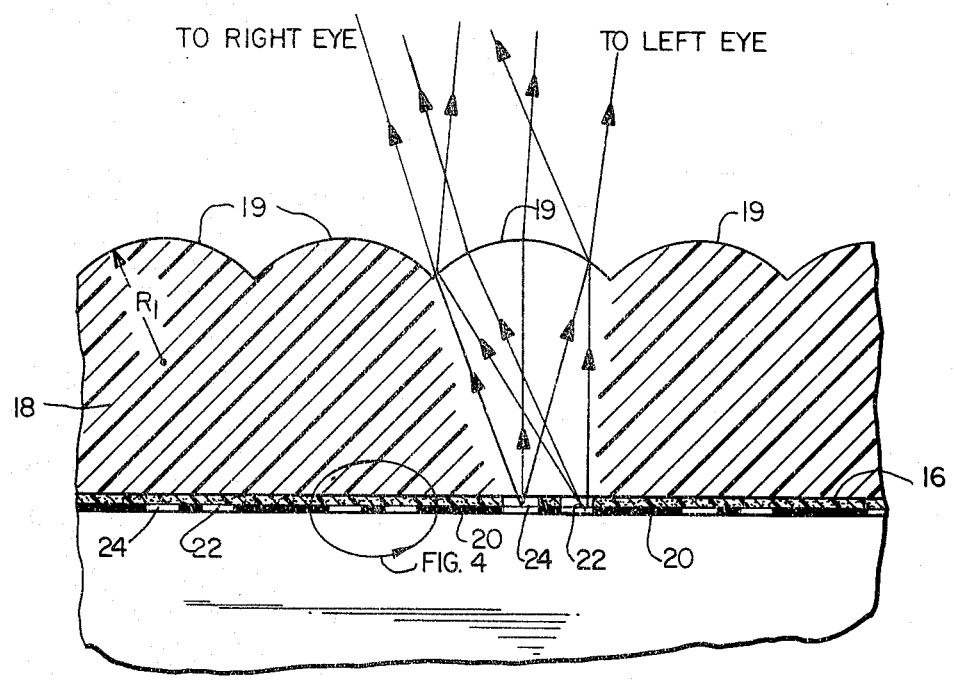
FIG. 3 is an enlarged view of the portion indicated within a circle of FIG. 1.
Figure 4:
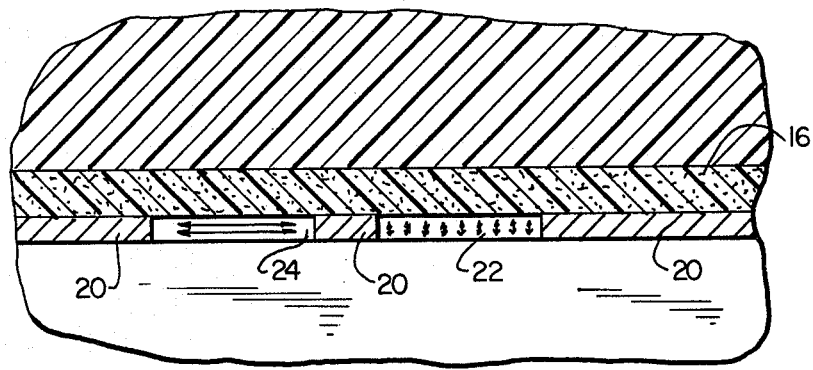
FIG. 4 is an enlarged view of that portion of FIG. 3 indicated within a circle of FIG. 3.

Referring now to FIGS. 3 and 4, greater detail is illustrated of several of the elements of FIG. 1. The diffuser screen 16 carries over its bottom surface an opaque coating denoted by the numeral 20. A pair of apertures is provided beneath each convex lens 19 of lenticular plate 18. Thus, aperture pairs 22, 24 extend over the entire surface of the viewing screen, there being two beneath and corresponding to each convex lens 19. In turn, lenses 19 extend over the entire surface of the viewing screen, as in the manner of squares on a checker board. It is to be noted that each aperture pair is correspondingly (homologously) positioned with respect to its associated convex lens 19.

As schematically indicated by the vertical, double-headed arrows at FIG. 4, each aperture 22 is provided with polarizing material which will pass only light polarized in one direction. Similarly, each aperture 24 is provided with polarizing material coating such that only light polarized in its one direction (note the horizontal arrows) will be transmitted therethrough. Thus, only properly polarized light incident upon apertures 22 will be passed by them and onto screen 16. The same is true with respect to apertures 24.

The reader will now be in a position to comprehend the mode of operation of the viewer. Referring now to FIG. 1, the microfiche 12, assumed to have been formed in a manner described in U.S. Pat. No. 3,824,609, is illuminated from below. The microimages on the emulsion are projected upwardly and through the left eye filters 50, 52, 54 through the right eye filters 56, 58, 60. Thereafter, the light passes through either the right or left polarizer 66 or 68, as indicated at FIG. 2, and continues its upward path. There being in the illustrated embodiment a single set of color filters 50–54 and 56–60 for each septa cell, the light passes upwardly and diverges somewhat, with each of the aperture pairs at the top of each septa cell receiving some light. That light which impinges upon opaque coating 20 is lost. A portion however of the light traveling upwardly strikes the aperture pairs 22, 24 at the top of each septa cell. Assume that polarizers 68 polarize light in the same direction as that which will be passed by the polarizing element associated with each aperture 22. Those microimages in microfiche 12 which were projected through polarizing elements 68 will be passed by the polarizers associated with mask openings 22 and be refracted by the convex lenses 19 for eventual passage to the right eye of an individual. Similarly, assuming that polarizers 66 polarize light in the same direction as that passed by polarizers in apertures 24, light passing from those microimages corresponding to the left eye will pass upward through polarizers 66 and will be passed by the polarizers associated with apertures 24 and will be refracted, as indicated at FIG. 3 and will pass to the left eye. Obviously, for the example given, light from polarizers 68 will not be passed by polarizers associated with apertures 24. Nor will light passing through polarizers 66 be passed through apertures 22. This same action obtains throughout the entire area of the viewing apparatus, i.e., over the entire area of microfiche 12. After such viewing, the microfiche 12 is indexed with respect to the openings in opaque coating 220 and the process repeated for each scene.

Figure 5:
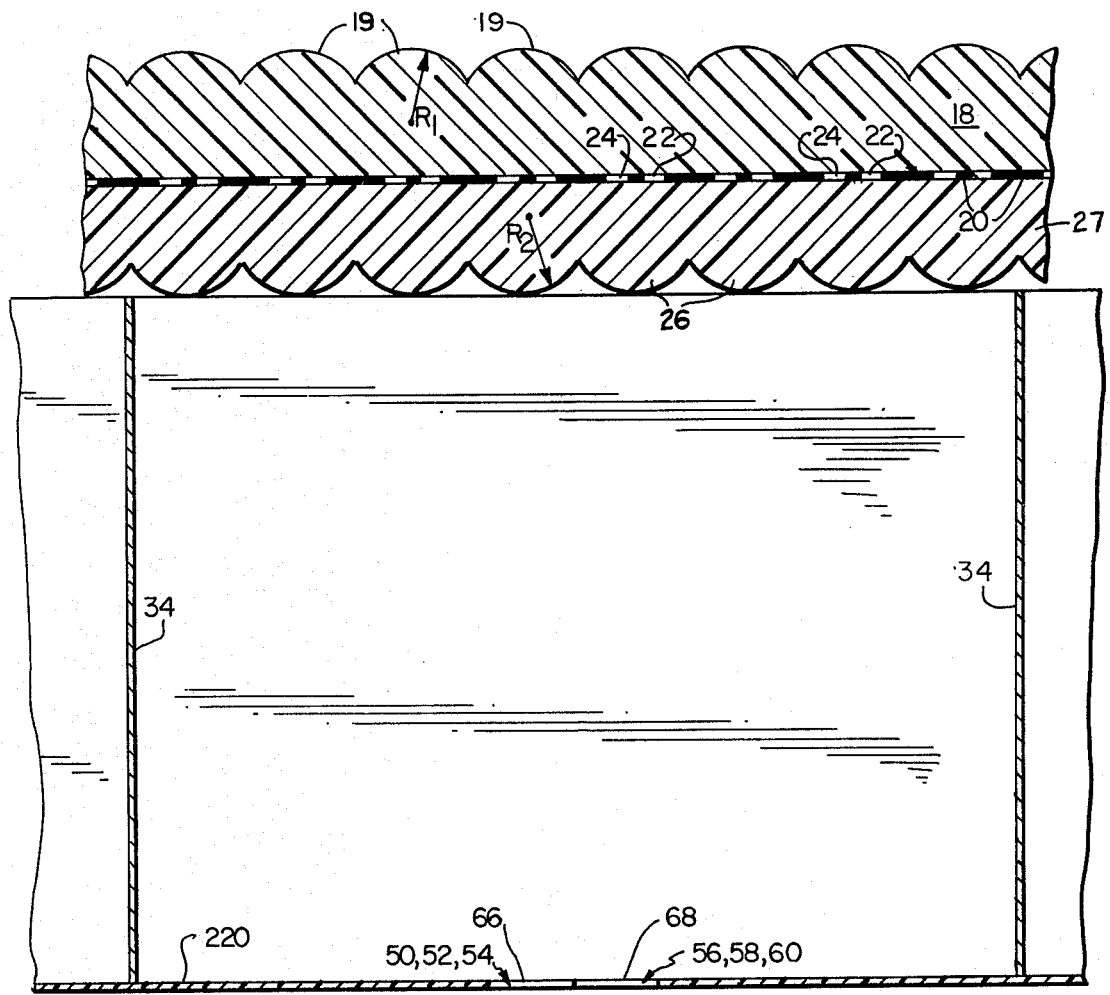
FIG. 5 is a view similar to FIG. 1 and illustrates an embodiment.

Referring now to FIG. 5 of the drawings, a modification is illustrated which includes downwardly extending convex lenses 26, similar to those denoted by the numeral 19, of a second lenticular plate 27. The function of these downwardly extending lenses is to further concentrate the light on the polarizing elements associated with aperture pairs 22, 24, i.e., to compensate for relatively large off-angle reception of the light rays from the single set of color filters 52–60 in each septa cell.

Figure 6:
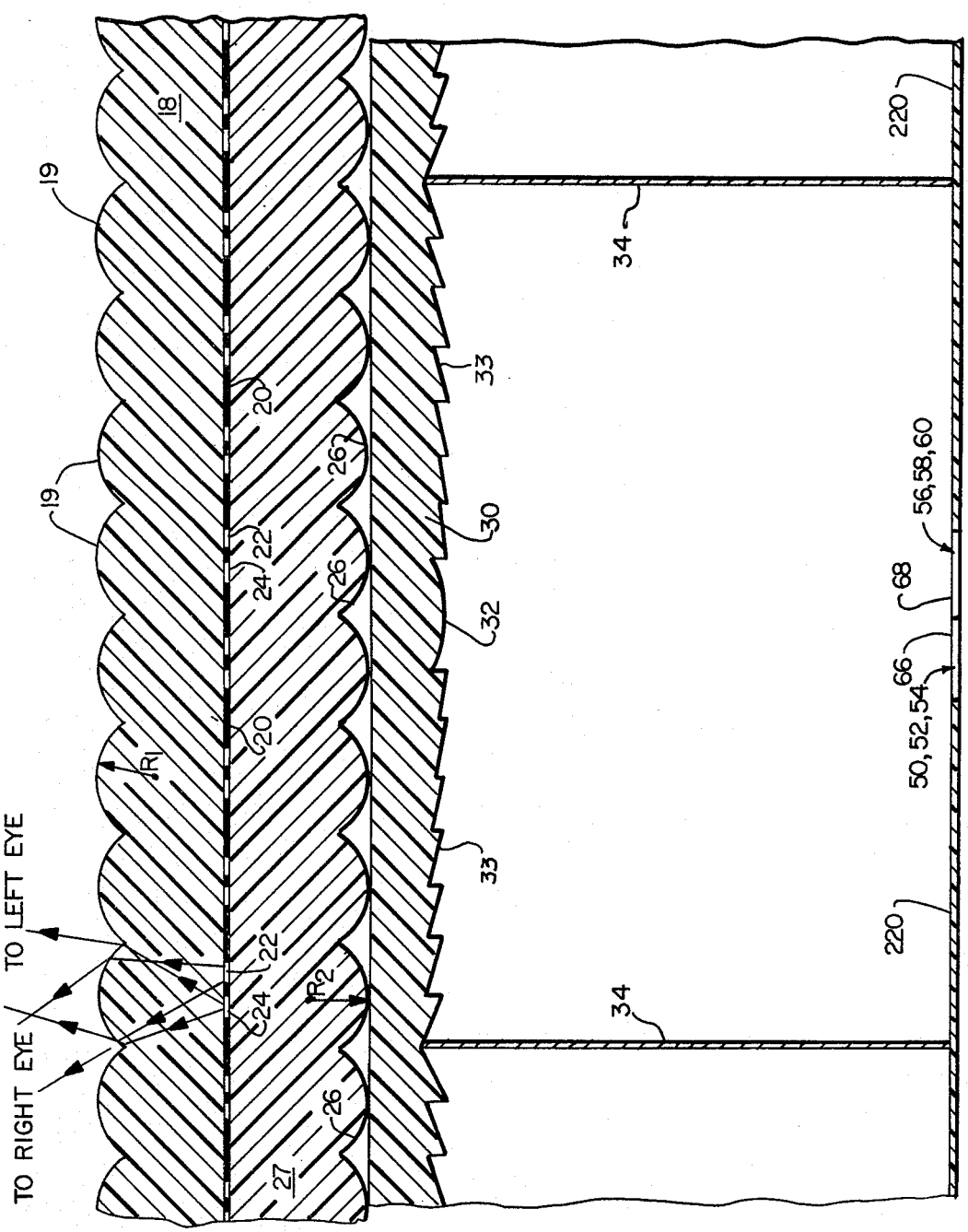
FIG. 6 is a view similar to FIG. 5 and illustrates still another embodiment.

FIG. 6 illustrates still another embodiment, similar to FIG. 5, for compensating for large off-angle reception of light from the color filters 50–60 by aperture pairs 22, 24. In FIG. 6, a Fresnel lens denoted by the numeral 30 is positioned as indicated, the central lens portion of the Fresnel lens denoted by the numeral 32 and the other lens portions by numeral 33. It is understood that there is one such Fresnel lens at the top of each of septa cell. As indicated by the light rays at FIG. 6, the Fresnel lensplate improves compensation for off-angle reception of light by the aperture pairs. Ideally, each aperture pair 22, 24 will receive light normal to its plane from color filters 50–60.

All of the individual elements thus far described with respect to the apparatus are known in the art, except for the mode of formation or fabrication of opaque coating 20 with its aperture 20, 24 and the mode of providing each aperture with its own polarizing element. The manner of fabricating these elements is as follows, the description first given of how opaque coating 20 is made having the aperture pairs 22, 24 therein. Assuming the lenticular lens plate 18 to be formed of a sheet of plastic such as poly methylmethacrylate which has been stamped to form lenses 19, its flat or bottom surface (referring to the embodiment of FIG. 1) is provided with the diffuser screen 16. A photographic emulsion is now coated on the screen 16. Next, the lenticular lens plate 18 with its diffuser screen and unexposed photographic emulsion is accurately located with respect to a light source positioned where the left eye of the individual would normally be located in viewing. The light source is energized and the convex lenses 19 focus the light at positions corresponding to openings 24. After this exposure, the now extinguished source of illumination is placed relative to the lenticular lens plate at a position where the right eye of the individual would normally be located in viewing. The source of illumination is again energized and the convex lenses image light at positions corresponding to openings 22. By this process, light is accurately imaged on the photographic emulsion at positions corresponding to openings 22, 24. The photographic emulsion is now reverse developed, the emulsion becoming opaque at all areas where it was not exposed and thereby defining transparent openings 22, 24 where it was exposed. This completes the formation of the opaque coating 20 having opening pairs 22, 24 properly positioned.

In the event that the apparatus is to be employed for viewing more than one three-dimensional scene at a time, the above-described process is repeated, each time placing the light sources at appropriate angles to the normal of the plane of lenticular plate 18. Such a process is known in the art.

It is important to note that the photographic emulsion must be coated over the diffuser 16, otherwise, no image will be formed for the eye of the individual viewer to perceive.

A description will now be given for one method of providing the transparent apertures 22, 24 with polarizing material. The photographic emulsion on diffuser screen 16 is coated with a photopolymer which contains a polarizing material such as dipyridylium. As is known, the alignment of dichroic molecules is achieved by intense static electric fields, the fields aligning the polarizing molecules. There are many ways of generating an intense electric field. One of the simplest is to employ a parallel plate capcitor impressed with a relatively large potential between its plates, the desired field accessible at the edges of the plate. If now the above-mentioned light source (preferably ultraviolet) is positioned corresponding to the left eye of the individual. such light will pass through the convex lenses 19, through apertures 24, and thence onto the coated photopolymer, i.e., onto the dipyridylium. An intense electric field being applied to the lenticular plate, the combination of the field and the ultraviolet light functions to polymerize the photopolymer at regions adjacent apertures 24, but not at regions corresponding to apertures 22. This is because no ultraviolet light will be focused at openings 22. After photopolymerization has been achieved at regions 24, the ultraviolet light source is now moved to where the right eye of the individual viewer will normally be positioned in viewing, and the above-described process repeated. Now, the light is imaged by lenses 19 at regions which will become apertures 22 but not at regions 24. The light source is energized and the electric field now applied in a direction perpendicular to that originally applied, so that orthogonal polarization is achieved at regions 22.

This completes the making of a lenticular plate viewing screen for the embodiment of FIG. 1. For the embodiments of FIGS. 5 and 6, it is only necessary to place the second lenticular plate 27 having convex lenses 26 on the opaque coating 20. The Fresnel lensplate 30 of the embodiment of FIG. 6 is placed, in turn, adjacent the lower lenticular lensplate.

Figure 7:
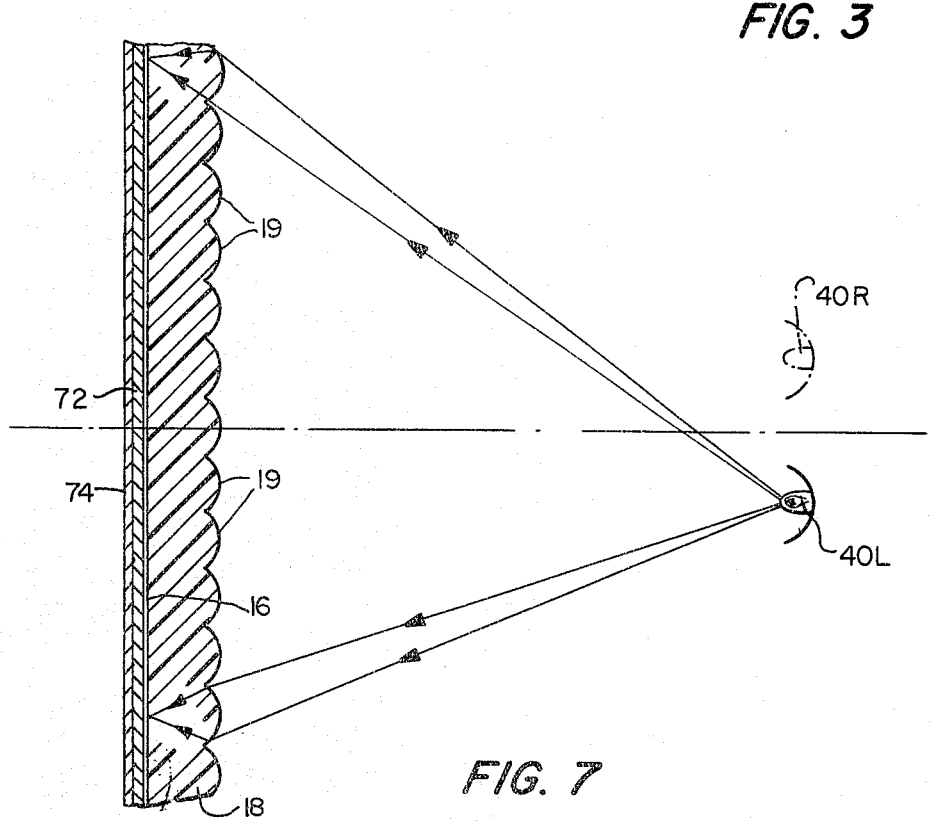
FIG. 7 is a partially schematic view illustrating the mode of formation of pairs of apertures in an opaque coating on the bottom of the viewing screen of FIG. 1.

Referring now to FIG. 7 of the drawings, the process which has just been described is schematically illustrated. The source of illumination is denoted by the numeral 40, an ultraviolet lamp. The left eye position of the illumination source is denoted by 40 L, while the right eye position is denoted by 40 R. The virgin photographic which will become the opaque aperture coating 20 is denoted by the numeral 72, while the photopolymer which will become polarized is denoted by the numeral 74. The width and consequently the total area of each of the openings 22, 24 is determined by the extent to which the lamp 40 deviates from an ideal point source of illumination.

A second method for forming the correct polarizing array is to stroke mechanically with a fine comb in order to align the polarizing molecules in proper direction. Such a mechanical action replaces the role of the electric field described immediately above.

I claim:

1. A method of making a three-dimensional viewing apparatus including the steps of,
    (a) providing the flat surface of a lenticular lensplate with a viewing screen having the property of transmitting and diffusing light incident thereon, the lenticular lensplate having lenses on one surface thereof and having a photographic emulsion on its other surface,
    (b) placing a source of illumination on the side of said lenticular lensplate which carries the lenses, the source being at a distance therefrom corresponding to the normal viewing distance of an individual,
    (c) energizing said source of illumination to thereby define a first area of activated photographic emulsion beneath and corresponding to each lens of the lensplate,
    moving said source of illumination laterally so that it occupies a position corresponding to the corresponding normal right eye viewing position of an individual,
    (e) activating said source of illumination to thereby define a second area of photographic emulsion activation beneath and corresponding to each convex lens, said first and second areas of photographic emulsion being spaced from each other,
    (f) processing the photographic emulsion so that the said first and second activated emulsion areas become transparent and the remaining, non-activated emulsion area becomes opaque, whereby the first and second emulsion areas beneath and corresponding to each lens of the lensplate define an aperture pair beneath and corresponding to each lens of the lensplate.

2. The method of claim 1 including the additional steps of,
    (a) placing a polarizable but unpolarized coating on the side of said photographic emulsion remote from said lensplate,
    (b) applying an electric field in one direction while carrying out step (c) of claim 2,
    (c) applying an electric field of similar strength at a direction at right angles to said first-mentioned electric field while carrying out step (e) of claim 2,
    (d) whereby one of each of said aperture pairs is polarized in one direction, and the other of each of said aperture pairs is polarized in an orthogonal direction.

* * * * *